United States Patent Office 3,130,225
Patented Apr. 21, 1964

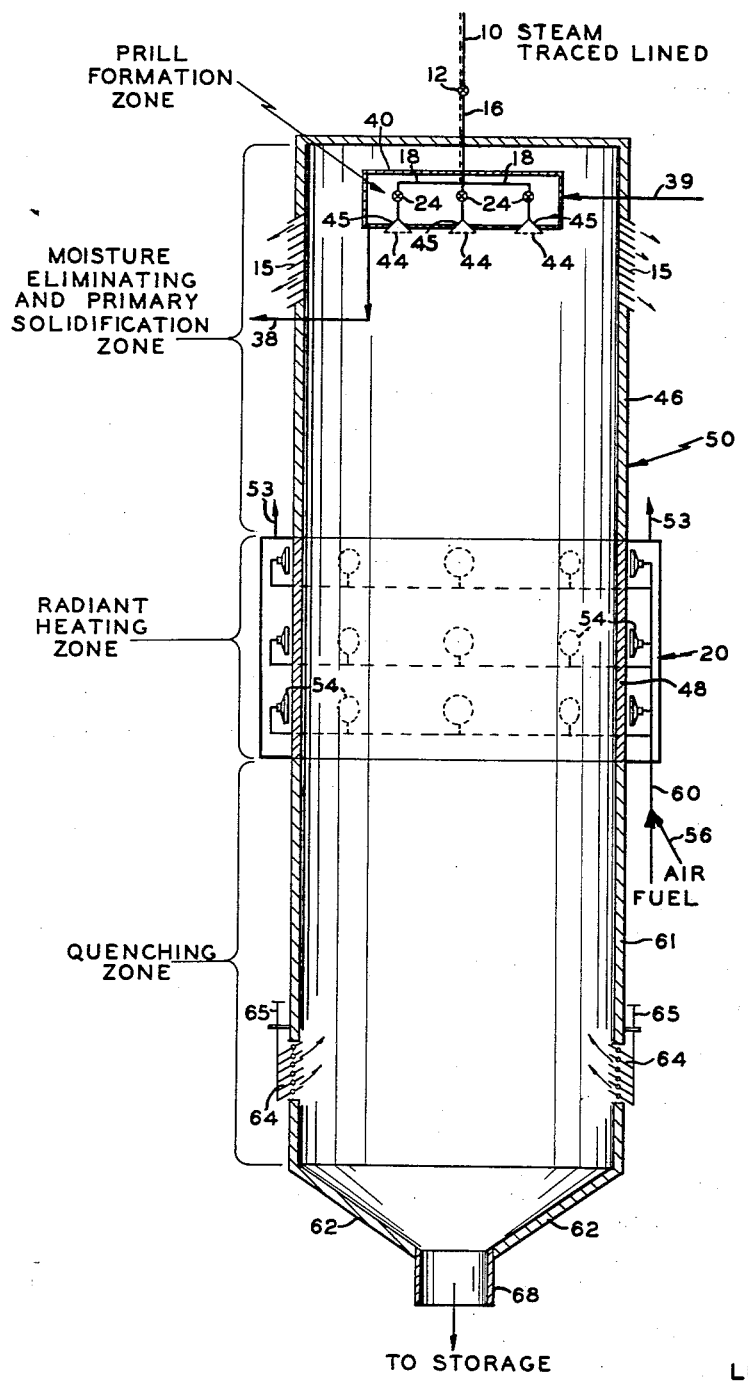

3,130,225
UREA PRODUCTION
Leo Friend, New Rochelle, N.Y., assignor, by mesne assignments, to Pullman Incorporated, a corporation of Delaware
Filed Feb. 12, 1962, Ser. No. 172,589
14 Claims. (Cl. 260—555)

This invention relates to the production of urea. More specifically, it relates to the production of urea prills. Still more specifically, in this aspect, it relates to improvements in the production of urea prills. In another aspect, it relates to the production of improved urea prills.

Urea is produced commercially at elevated temperatures and pressures by reacting ammonia and carbon dioxide in a synthesis autoclave. In this reaction a mol of water is produced with each mol of urea. The resulting urea solution is heated in an evaporation zone wherein the urea is concentrated by removal of all but a small percentage of water. Since urea decomposition to biuret is enhanced by heating, the urea solution must be removed from the evaporation zone before all of the water is removed in order to minimize the quantity of biuret formed. In the past, the presence of residual water in the urea has led to many problems, especially during the prilling operation as hereinafter described.

Commercial prilling operations, for the most part, are operated in the following manner. Highly concentrated urea is introduced at the top of a prilling tower into a prill-forming vessel situated near the top of the tower. The urea is forced through a plurality of foramina at the bottom of this vessel and emerges in to the upper region of the prilling tower as discrete liquid droplets. Cool air, introduced at the bottom of the tower contacts those droplets as they fall by gravity causing them to solidify. But a problem arises from the rapid flow of air past the hot prills, which promotes rapid evaporation of the residual moisture associated with the urea as it is being solidified. While further removal of moistures from urea is desirable from the standpoint that a low water content is most desirable, unfortunately, evaporation of water from the solidifying prills causes the prills to form with a porous structure. It has been noted that when such prills are stored for a considerable period of time they agglomerate or cake together to such an extent that the agglomerate is removed from storage only with great difficulty and expense. The resulting product has poor flow properties and is not desirable for commercial agricultural and industrial applications.

An object of the present invention is to provide a process for producing urea prills of improved quality.

Another object is to provide means for producing urea prills of improved quality.

Another object is to provide urea prills of improved quality.

Another object is to provide method and means for producing urea prills which do not cake together during storage and which have improved flow properties.

Other objects and advantages of the present invention will become apparent to those skilled in the art from the following specification and disclosure.

According to one aspect, the objects of this invention are accomplished by the production of urea prills having a new and improved structure. The new prill structure comprises a porous urea core and a thin in situ formed sealing layer of urea disposed upon the core. The core is permeated by a network of capillary-sized defects or pores formed as a result of residual liquid escaping from the urea during prilling; and the sealing layer of urea, formed in situ upon the core, covers the core surface and produces a perfected prill essentially free of surface defects. The perfected prill surface prevents the ingress of moisture into the capillary defects contained within the prill core, and as a result the prill remains solid and resistant to caking even during storage for extended periods of time.

According to another aspect, perfected prills are produced by subjecting urea prills, which have been treated such that at least part of the residual moisture has been removed therefrom and which have been at least partially solidified, to rapid heating in order to rapidly liquify the prill surfaces, and thereafter to rapid cooling to solidify the urea and inhibit biuret formation. In this manner a thin sealing layer is formed in situ at the surface of the defect-containing prills, which defect-containing portion is thereby made the core of the perfected prill structure. This process is effected very rapidly mainly to prevent decomposition to biuret.

In order to provide a better understanding of the present invention, reference is now had to the figure of the drawing which illustrates diagrammatically in elevation a preferred embodiment of one form of an apparatus suitable for carrying out the process and preparing the product of the present invention.

Briefly, the apparatus illustrates in combination a prilling tower 50 adapted with means for prilling concentrated urea solutions, means for evaporating residual water and solidifying the prills, means for rapidly melting the surfaces of the prills, and means for quench cooling the melted surfaces of the prills. The means for prilling urea solutions include spray headers 45 and foraminous plates 44 as well as other ancillary equipment contained within steam jacket 40, situated near the top of the tower. The means for evaporating and solidifying prills include means for introducing heated gas into the region denoted as the moisture elimination and primary solidification zone, and means for withdrawing the gas, shown as vents 15 at the top of the tower. Gas is initially induced into the tower by natural convection through vents 64 near the bottom of the tower; is heated by contact with hot prills descending through the tower, and is withdrawn by means of vents 64. The means for rapidly heating prills descending from the moisture eliminating zone include furnace 20 situated on vertical wall 48 of tower 50 between the moisture eliminating and primary solidification region and the quenching region. Wall 48 is constructed from a material such that when it is heated to its radiating temperature it emits radiation as hereinafter described.

Quench cooling means including means for introducing a quenching agent to rapidly cool the surfaces of prills melted in the radiant heating zone. In the figure the means are illustrated by vents 64 which allow cool air from the atmosphere to enter the tower.

A preferred embodiment of the process of the present invention is practiced in the apparatus shown in the figure when concentrated urea is passed, seriatim, through the zones denoted generally in the figure as a prill formation zone, a moisture eliminating and primary solidification zone, a radiant heating zone, and a quneching zone, as hereinafter described.

Concentrated urea solution is introduced into tower 50 by means of conduit 16 at a rate controlled by valve 12 situated thereon. The urea solution is introduced into the prill formation zone by means of a plurality of branch conduits 18 having control valves 24 situated thereon. In this instance, the prill formation zone comprises a plurality of spray headers 45, constructed in the shape of inverted funnels having foraminous plates 44 situated at the bottom thereof. The urea solution introduced into this zone has been previously concentrated generally to greater than about 99.0 percent and preferably to greater than about 99.5 percent by weight urea. The urea at this stage contains between about .2 and about 1.0 percent by weight biuret. The temperature of the solution in this zone is maintained between the limits of about 270° and about 290° F. by suitable heating means. Within this range the lowest possible temperature at which the urea remains molten is preferred in order to minimize biuret formation. Although any suitable means for preventing solidification of the urea may be used, a steam jacket is preferably employed for this purpose. Steam jacket 40, shown in the figure, encloses spray headers 45, and conduits 18 and valves 24 leaving only the foraminous plates 44 at the bottom of the jacket unenclosed. Steam is introduced into jacket 40 by means of conduit 39 and conlidification of the urea being introduced into the tower. 38. Conduit 10 is normally steam traced to prevent solidification of the urea being introduced into the tower. The concentrated urea solution resides in the prill formation zone for a period of between about ½ and about 5.0 seconds, which period is preferably minimized in order to minimize biuret formation. Residence time is controlled by the rate of introduction of urea through valve 12. The hot urea passes from spray headers 45 through foraminous plates 44 and emerges into the upper region of tower 50 as discrete liquid droplets, hereinafter referred to as prills, thus leaving the prill formation zone and entering the moisture eliminating and primary solidification zone.

That portion of the upper region of tower 50, which is enclosed by vertical closure wall 46, corresponds to the moisture eliminating and primary solidification zone previously referred to. The operation of this zone is such that at least a portion of the residual water is evaporated from the prills. By reason of this evaporation the prills are cooled and consequently are at least partially solidified. Evaporation occurs because of the contact between the descending prills and rising gas, the flow of the gas through the apparatus in the figure being hereinafter described. Gas enters the moisture eliminating zone from the radiant heating zone shown in the figure at a temperature of between about 100 and about 175° F. The gas leaves this zone through vents 15 at a temperature which is elevated slightly over the inlet temperature by reason of its contact with the hot prills. Additional control over the temperature of the gas in the moisture elimination zone, where needed, is effected by allowing cool air from the atmosphere to enter the tower at the bottom of closure wall 46. The amount of residual water which evaporates is governed by several factors including the temperature of the gas, gas flow rate, the amount of water originally present, and residence time within the zone. The amount of water evaporated varies with conditions but is generally less than about 0.2 percent by weight. The residence time within this zone is controlled as hereinafter described so that the prills remain within the zone for at least about 3 seconds in order that at least partial solidification of the prills is achieved. It is sufficient that the prills are set up into the aforementioned porous structure, without their being completely hardened, before they are withdrawn from this zone into the radiant heating zone. In the apparatus in the figure, for a given height of closure wall 46, the residence time of the prills within the moisture eliminating zone is controlled by the fluidizing effect of the aforementioned gas rising in the zone countercurrently to the prills. Since, as will be explained later herein, the fluidizing effect of the gas is regulated primarily to insure a proper residence time within the radiant heating zone, sometimes the prills are completely solidified before they are withdrawn to the radiant heating zone. Such prills if not further treated readily absorb moisture and tend to cake together during storage.

Prills are withdrawn from the moisture eliminating zone and subjected to rapid heating in such a manner that only a small percentage of the total prill is liquified, this portion being at the prill surface. It is important that the heating be accomplished rapidly in order that decomposition be minimized. In the figure the rapid heating is accomplished by irradiating the prills in a radiant heating zone. That portion of tower 50 enclosed by vertical closure wall 48, having furnace 20 situated thereon, generally corresponds to the radiant heating zone. In this zone, the surfaces of the prills are rapidly melted by exposure to radiant energy. The surfaces of the opaque prill bodies absorb the radiant energy to which they are exposed and rapidly dissipate the absorbed energy as heat, which causes the prill surfaces to melt. Radiant energy is provided in such quantities that the surfaces of the prills are melted to the extent of between about 1 and about 10 percent of the total prill weight. As a result of this melting, liquid urea flows over the prill surfaces substantially covering at the surfaces of the prills the aforementioned defects. In this manner, in situ formed sealing layers are provided on the prill surfaces, the layers being effective in preventing moisture from being absorbed by the prills.

Since it is an essential feature of this process that the prills within the radiant heating zone be irradiated with a sufficient quantity of energy to melt the prill surfaces within the limits as hereinbefore set forth, methods of achieving this purpose are set forth. One method of providing the required quantity of radiation is illustrated by the apparatus in the figure. In this instance the required amount of melting is accomplished by maintaining the prills for a length of time in the presence of vertical closure wall 48, which is maintained by suitable heating means at least at its radiating temperature, as a lower limit, and its melting point as an upper limit. In general in order to accomplish the desired degree of melting, vertical closure wall 48 is maintained at a temperature between about 1000° and about 1500° F., and the prills reside in the radiation zone for a period between about ½ and about 1 second. Materials which are used for wall 48 are, for example, stainless steel, nickel-containing alloys, chromium and molybdenum containing alloys, and, preferably, commercial carbon steel.

In order to maintain vertical closure wall 48 at the desired temperature, fuel gases are burned in furnace 20, which is situated on tower 50 in close contact with wall 48. The fuel gases in line 60 are mixed with air introduced by means of line 56 prior to combustion in burners 54. Exhaust fumes leave the furnace by means of line 53. Any suitable industrial gas or oil fuel may be employed for this purpose. The desired temperature can be achieved by employing other methods of heating wall 48 such as, for example, an electrical heating element either of the induction or resistance variety. Other suitable methods of providing the required quantity of radiant energy can also be employed in the practice of this invention.

In the case where a radiation emitter is employed which does not depend upon thermal excitation to produce emission of radiant energy, the quantity of radiation necessary to remelt the desired portion of prill surfaces is calculated on an equivalent basis. The quantity of radiation which is produced when ordinary carbon steel is heated to the temperature limits as hereinbefore set forth is measured by standard means and the emitter is adjusted to produce that quantity of radiation. Therefore, the utilization of other radiation emitting means is not only within the scope of this invention; but the limits of operation of another radiation source is readily calculated on the basis set forth herein.

The quantity of radiant energy absorbed by the prills as they pass through the radiant heating zone is controlled not only by the quantity of radiant energy which is emitted but also by other factors including the residence time of the prills in the radiation zone and the proximity of the prills to the source of energy. In the apparatus shown in the figure, residence time depends upon the vertical height of closure wall 48 and also upon the rate of descent of the prill. The rate of descent is controlled by the rate of gas flowing upwardly in tower 50 countercurrently to the descending prills and the fluidizing effect thereof. Cold gas, preferably air from the atmosphere, enters tower 50 through vents 64 situated near the base of the tower. The gas flows upwardly in the tower by natural convection and exits at the top of the tower through vents 15. The velocity and fluidizing effect of this gas is controlled by setting shutter valves 65 situated on vents 64 which adjusts the quantity of gas entering the tower. The shutter valves are adjusted so that the residence time of the prills in the radiant heating zone is between about ½ and about 1 second. Furthermore, the gas flowing through the radiating zone causes turbulence, which causes the prills to be laterally distributed about the zone. In this manner absorption gradiants are eliminated which would otherwise exist due to varying proximity of prills to the radiating surface of the tower.

The prills pass from the radiant heating zone, wherein their surfaces are melted, into the quenching zone, wherein their surfaces are rapidly cooled and solidified. In the apparatus shown in the figure, the region of tower 50 enclosed by vertical closure wall 61 corresponds to the quenching zone. The quenching action is achieved by the introduction of cold gas such as, for example, air from the atmosphere or other suitable quenching agents, at an intermediate point within the quenching zone. In the figure cold gas is introduced through vents 64 at a rate controlled by shutter valves 65 into the lower portion of the quenching zone. The agent is introduced in such a manner that a sufficient quantity is present for the rapid solidification of the prill surfaces. Substantially instantaneous solidification is preferred to minimize biuret.

Perfected prills impinge upon base 62 of tower 50, which is sloped downwardly towards the center of the tower, and are withdrawn to storage by prill withdrawing means 68. The perfected prills have equivalent diameters ranging between about .2 and about 6 millimeters. Their analysis is between about 0.3 and 1.5 percent by weight biuret and less than about 0.5 percent by weight water. The average thickness of the in situ formed sealing layer disposed upon the defect containing core is between about 1/10 and about ¼ millimeter.

*Example*

The apparatus employed is a prilling tower 50 adapted with a furnace 20 to provide radiant heating. The tower is 125 feet high, 17 feet wide, having four sides of equal length. The bottom of the furnace is situated 60 feet from the base of the tower and extends 10 feet vertically, from that point. Vertical closure wall 48, enclosed by the furnace, is made of commercial carbon steel.

Prills are formed by the introduction of concentrated urea solution into spray headers 45 through line 10 at the rate of 15,000 pounds per hour and by the passage of this urea through foraminous plates 44. The urea solution comprises in percent by weight of solution: 99.2 urea, 0.4 biuret, and 0.4 water. The solution is maintained within the prill forming means for a time of 5 seconds at a temperature of 280° F., maintained by introducing steam through line 39 into jacket 40 at a controlled rate.

Air, introduced into the tower through vents 64 is controlled by valve 65, is heated by contact with hot prills as it flows upwardly in the tower. This air heated to about 200° F. contacts prills as they emanate from plates 44 causing about 50 percent of the residual water to evaporate from the prills and causing substantially complete solidification to occur prior to entrance into the radiant heating zone. The prill residence time in the moisture eliminating and primary solidification zone is about 5 seconds.

The prills pass from the moisture eliminating zone into the radiant heating zone. The flow of gas upwardly through the tower is adjusted by the setting of shutter valve 65 such that the prills reside for ¾ second within vertical closure wall 48, maintained at 1200° F. by furnace 20.

The prills pass from the radiant heating zone into the quenching zone where they are contacted with air introduced through vent 64 at a temperature of about 60° F. The prills are rapidly quench cooled and solidified, and perfected prills are withdrawn through conduit 68 at the bottom of the tower at a rate of 15,000 pounds per hour.

The prills have diameters ranging between 2 and 6 millimeters, and an angle of repose of about 25°. The prills analyze about 0.4 percent by weight biuret and about 0.2 percent by weight of water. The prills have a substantially perfect surface layer disposed upon a pore containing core.

Numerous advantages accrue through the production of urea prills according to the present invention. For example, the product so prepared is substantially non-caking and freed of surface defects. The network of capillary-sized defects extending throughout the core of the prill is closed off from the atmosphere by the in situ formed sealing layer. Whereas moisture is normally absorbed and taken within the interstices of untreated prills by what is believed to be capillary action, although this hypothesis does not limit the scope of the invention, the sealing layer formed on the surface of the prills precludes absorption of moisture in this fashion. Since the sealing layer is formed from the material of the prill itself, it is not necessary to coat or to otherwise treat the urea product with foreign substances in order to prevent caking. As a result of the perfection of the prill surfaces the prills have a lower angle of repose than prills produced by prior processes and consequently they flow more freely from storage, and are more evenly distributed over the soil in agricultural applications.

Since the new and improved results and advantages over the prior methods are achieved by subjecting urea to high temperature treatment, it might be expected that the biuret content of the product would be greatly increased, for it is well known that high temperature favors decomposition of urea to biuret. Surprisingly, however, biuret formation is maintained at an extremely low value in the treatment of urea in accordance with the present invention. Furthermore, the present invention provides an economically attractive means and method for retaining and enhancing the usefulness of the conventional prilling towers in use at the present date.

Having thus described the invention with reference to a particular example thereof, it is to be understood that many modifications and alterations will become apparent to those skilled in the art without departing from the scope of this invention. For example, means other than those employed herein, which achieve rapid heating and then rapid quenching of prills, and in this manner produces a sealing layer of urea upon a defect containing urea core, are within the scope of this invention. In reference to the apparatus herein described it is to be understood that the shapes and sizes of the component elements are merely illustrative and, in particular, that a prilling tower, whether circular, square, or rectangular can be employed in the practice of the present invention. These modifications and adaptations may be made by those skilled in the art to fulfill the requirements of a given situation without departing from the scope of this invention.

I claim:

1. A process for producing surface-perfected prills of urea from imperfect prills of urea from which at least part of the residual moisture has been removed and which are at least partially solidified, which comprises rapidly heating said imperfect prills to rapidly liquefy the surfaces of said prills, and thereafter rapidly cooling said prills to inhibit biuret formation and to form a thin sealing layer over the surface of said prills.

2. The process of claim 1 in which said imperfect prills are rapidly heated in the presence of radiant energy.

3. The process of claim 1 in which said imperfect prills are rapidly heated in the presence of radiant energy for about ½ to about 1 second.

4. A process for producing surface-perfected prills of urea from at least partially solidified imperfect prills of urea from which at least part of the residual moisture has escaped, which comprises heating said imperfect prills in the presence of sufficient radiant energy to rapidly melt the surfaces thereof, and then cooling said prills rapidly to inhibit biuret formation and to form a thin sealing layer over the surfaces of said imperfect prills.

5. A process for producing surface-perfected prills of urea which comprises forming liquid prills from concentrated urea solution comprising urea and water in a prill formation zone; withdrawing said liquid prills to a moisture eliminating and primary solidification zone wherein at least a portion of said water is removed from said liquid prills and said liquid prills are at least partially solidified thereby forming defect-containing prills; withdrawing said defect-containing prills to a radiant heating zone wherein the surfaces of said defect-containing prills are rapidly melted by exposure to radiant energy to liquefy the surfaces thereof; and, thereafter, withdrawing said defect-containing prills having melted surfaces to a quench cooling zone wherein said melted surfaces are rapidly solidified to inhibit the biuret formation and to form a thin sealing layer over the surfaces of said prills.

6. The process of claim 5 wherein the residence time of said liquid prills within said moisture eliminating and primary solidification zone is at least about 3 seconds.

7. The process of claim 5 wherein the residence time of said defect-containing prills having melted surfaces in said quench cooling zone is between about 1 and about 5 seconds.

8. The process of claim 5 wherein said liquid prills are contacted with gas in said moisture eliminating and primary solidification zone in order to remove at least a portion of the water in said liquid prills and to at least partially solidify said liquid prills.

9. The process of claim 5 wherein the melted surfaces of said prills are rapidly solidified by contacting said prills with a cool gas.

10. The process of claim 5 wherein the residence time of said defect-containing prills within said radiant heating zone is between about ½ and about 1 second, and conditions of proximity to the radiating source and quantity of radiation emitted from said source are such that said prills are melted to between about 1 and about 10 percent by weight, said melting occurring primarily at the surface of said prills.

11. The process of claim 10 wherein said defect-containing prills are countercurrently contacted with a gas in order to maintain said residence time.

12. A process for manufacturing perfected prills of urea having an in situ formed sealing layer disposed upon a porous defect-containing core which comprises: introducing a concentrated solution of urea and water into a prill formation zone, withdrawing liquid prills from said prill formation zone, countercurrently contacting said liquid prills withdrawn from said prill formation zone with air withdrawn from a radiant heating zone in a second zone maintained under conditions suitable to at least partially solidify and to remove at least part of the residual moisture from said liquid prills thereby producing defect-containing prills, exposing said defect-containing prills to radiant energy in a radiant heating zone and in the presence of a countercurrent flow of air, said radiant heating zone being maintained under conditions suitable to rapidly melt the surface of said defect-containing prills, countercurrently contacting said defect-containing prills having melted surfaces withdrawn from said radiant heating zone with cool air in a quench cooling zone maintained under suitable conditions to rapidly re-solidify said melted surfaces to inhibit biuret formation and to produce prills having an in situ formed sealing layer disposed upon a defect-containing core.

13. An apparatus for producing perfected prills of urea which comprises in combination: a prilling tower which forms a substantial enclosure, prill forming means disposed within an upper portion of said tower, said prill forming means adapted to receive solutions and to form prills therefrom; a second means for eliminating moisture from and at least partially solidifying prills situated within said tower at a region vertically below said prill forming means; radiant heating means for rapidly melting the surfaces of prills withdrawn from said second means situated at a point within said tower vertically below said second means; and quench cooling means for rapidly solidifying the melted surfaces of said prills withdrawn from said radiant heating means situated within said tower at a point vertically below said radiant heating means.

14. Prills comprising about 0.3 to about 1.5% by weight biuret, less than about 0.5% by weight water, and the balance urea, having diameters between 0.2 and 6 millimeters, the structure of each of said prills which comprises a core permeated by a network of capillary-sized pores and a sealing layer of urea which covers the core surface so that the surface of the said prill is essentially free of defects, said surface making up from about 1 to about 10% of the total weight of the prill.

References Cited in the file of this patent

UNITED STATES PATENTS

| | | |
|---|---|---|
| 2,038,251 | Vogt | Apr. 21, 1936 |
| 2,528,407 | Yeandle | Oct. 31, 1950 |
| 2,921,335 | Bowers et al. | Jan. 19, 1960 |
| 3,025,571 | Beecher et al. | Mar. 20, 1962 |
| 3,046,607 | Blaha | July 31, 1962 |

UNITED STATES PATENT OFFICE
CERTIFICATE OF CORRECTION

Patent No. 3,130,225 April 21, 1964

Leo Friend

It is hereby certified that error appears in the above numbered patent requiring correction and that the said Letters Patent should read as corrected below.

Column 1, line 40, for "moistures" read -- moisture --; column 2, line 49, for "including" read -- includes --; column 3, line 14, strike out "lidification of the urea being introduced into the tower." and insert instead -- densate is removed from the jacket by means of conduit --; line 16, for "idification" read -- lidification --.

Signed and sealed this 15th day of September 1964.

(SEAL)
Attest:

ERNEST W. SWIDER
Attesting Officer

EDWARD J. BRENNER
Commissioner of Patents